United States Patent
Stauder et al.

(10) Patent No.: US 10,041,512 B2
(45) Date of Patent: Aug. 7, 2018

(54) LINEAR ACTUATOR

(71) Applicant: Continental Teves AG & Co. oHG, Frankfurt (DE)

(72) Inventors: Peter Stauder, Mainz (DE); Matthias Schaaf, Koblenz (DE); Tom Kaufmann, Ippenschied (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 225 days.

(21) Appl. No.: 15/039,903

(22) PCT Filed: Nov. 17, 2014

(86) PCT No.: PCT/EP2014/074756
§ 371 (c)(1),
(2) Date: May 27, 2016

(87) PCT Pub. No.: WO2015/082199
PCT Pub. Date: Jun. 11, 2015

(65) Prior Publication Data
US 2016/0377099 A1    Dec. 29, 2016

(30) Foreign Application Priority Data
Dec. 6, 2013  (DE) .................. 10 2013 225 200

(51) Int. Cl.
*F15B 15/14* (2006.01)
*H02K 7/06* (2006.01)
(Continued)

(52) U.S. Cl.
CPC ........ *F15B 15/1404* (2013.01); *B60T 13/746* (2013.01); *F04B 17/042* (2013.01);
(Continued)

(58) Field of Classification Search
CPC ..... F15B 2015/1495; F16H 2025/2075; F16H 25/2204; H02K 7/06
See application file for complete search history.

(56) References Cited

U.S. PATENT DOCUMENTS

| 2,860,266 A | 11/1958 | Schrader |
| 4,521,707 A * | 6/1985 | Baker ............... F16H 25/20 310/112 |

(Continued)

FOREIGN PATENT DOCUMENTS

| DE | 112005003675 | 7/2008 |
| DE | 102007029579 | 1/2009 |

(Continued)

OTHER PUBLICATIONS

German Search Report dated Nov. 10, 2016 for German Application No. 102013225200.5, including partial English translation, 8 pages.
(Continued)

*Primary Examiner* — Thomas E Lazo
(74) *Attorney, Agent, or Firm* — RatnerPrestia

(57) ABSTRACT

A linear actuator for generating a linear actuating force, including a first drive unit having a first drive shaft designed as a hollow shaft, a first rotation-translation transmission driven by the first drive unit, having a first threaded spindle and a first threaded nut engaging with the threaded spindle, wherein the drive shaft of the first drive unit is designed as a first threaded spindle, a second drive unit arranged axially to the first drive unit and having a drive shaft, and a second rotation-translation transmission driven by the second drive unit, having a second threaded spindle and a threaded nut engaging with the second threaded spindle, wherein the drive shaft of the second drive unit is connected to the second threaded spindle; via the hollow shaft in a rotationally fixed manner.

13 Claims, 1 Drawing Sheet

(51) Int. Cl.
*B60T 13/74* (2006.01)
*H02K 5/173* (2006.01)
*H02K 7/08* (2006.01)
*H02K 16/00* (2006.01)
*F04B 17/04* (2006.01)
*F16H 25/22* (2006.01)
*F16H 25/20* (2006.01)

(52) U.S. Cl.
CPC ....... *F15B 15/1447* (2013.01); *F16H 25/205* (2013.01); *F16H 25/2204* (2013.01); *H02K 5/1732* (2013.01); *H02K 7/06* (2013.01); *H02K 7/083* (2013.01); *H02K 16/00* (2013.01); *F15B 2015/1495* (2013.01); *F16H 2025/2075* (2013.01)

(56) References Cited

U.S. PATENT DOCUMENTS

| | | | | |
|---|---|---|---|---|
| 5,557,154 | A | * | 9/1996 | Erhart ........................ F04B 7/00 310/68 B |
| 7,883,054 | B2 | * | 2/2011 | Elliott ..................... B64C 13/28 244/99.9 |
| 2009/0021092 | A1 | | 1/2009 | Elliott |
| 2012/0304787 | A1 | | 12/2012 | Quenerch'Du et al. |

FOREIGN PATENT DOCUMENTS

| | | |
|---|---|---|
| DE | 102009019209 | 11/2010 |
| DE | 202010016542 | 3/2011 |
| WO | 2007024220 | 3/2007 |
| WO | 2008023198 | 2/2008 |

OTHER PUBLICATIONS

Japanese Notice of Reasons for Refusal for Japanese Application No. 2016-555912, dated Feb. 24, 2017, including English translation, 8 pages.
International Search Report and Written Opinion of the International Searching Authority for International Application No. PCT/EP2014/074756 dated Mar. 30, 2015.

* cited by examiner

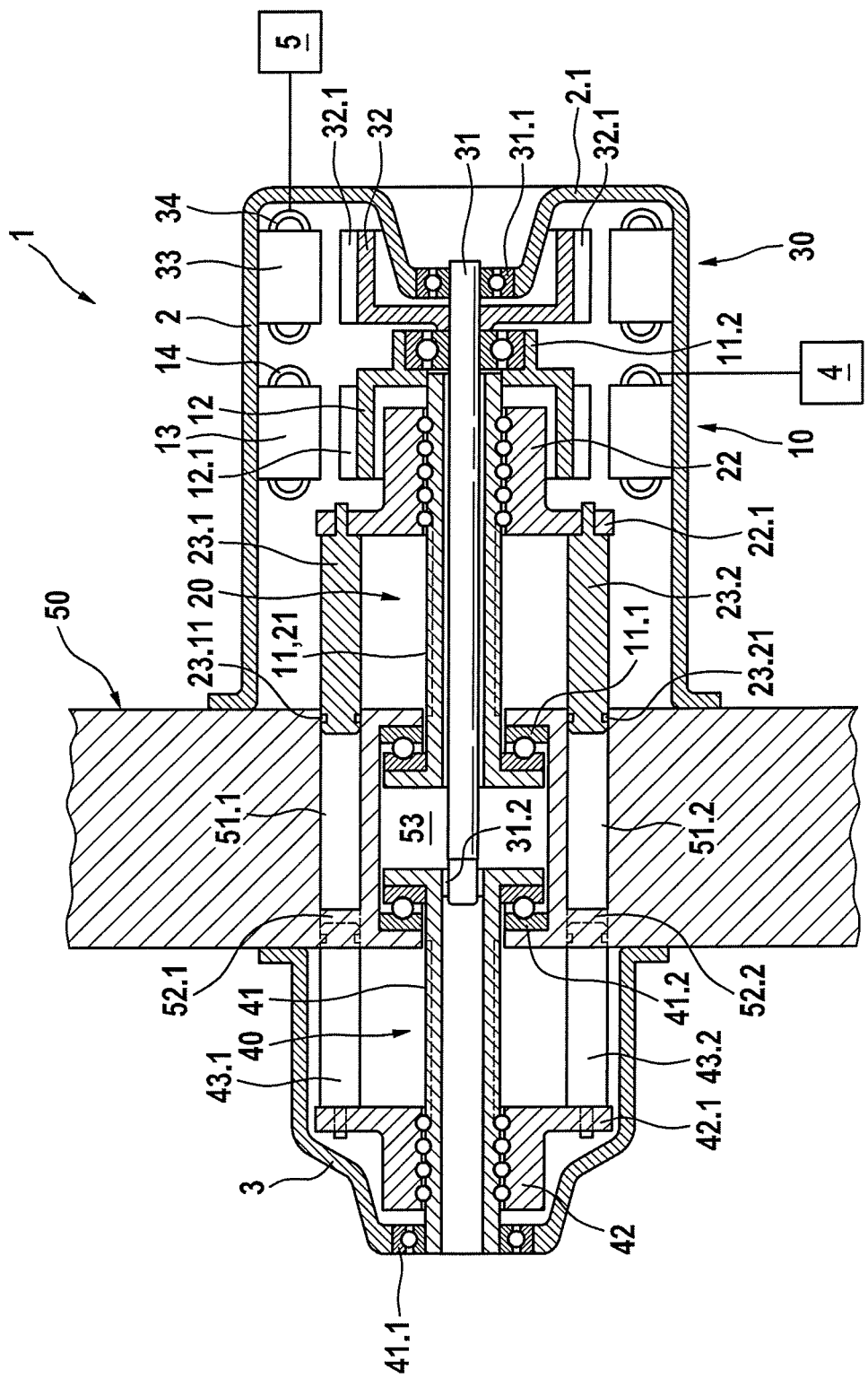

LINEAR ACTUATOR

CROSS REFERENCE TO RELATED APPLICATIONS

This application is the U.S. National Phase Application of PCT International Application No. PCT/EP2014/074756, filed Nov. 17, 2014, which claims priority to German Patent Application No. DE 10 2013 225 200.5, filed Dec. 6, 2013, the contents of such applications being incorporated by reference herein.

FIELD OF THE INVENTION

The invention concerns a linear actuator for generating a linear actuating force.

BACKGROUND OF THE INVENTION

Hydraulic linear actuators are known which are used in hydraulic vehicle braking systems, in particular also in brake-by-wire braking systems. Such a hydraulic linear actuator is known for example from DE 10 2009 019 209, which is incorporated by reference. This linear actuator consists of a rotation-translation gear formed as a ball-screw drive and having a threaded spindle and an associated threaded nut, and of a brushless electric motor with a rotor and a stator which are arranged in a housing. The threaded spindle constitutes the drive shaft of the electric motor and is therefore driven directly thereby, while the threaded nut is arranged non-rotatably on a hydraulic piston-cylinder arrangement which forms the master cylinder of a vehicle braking system.

Such a hydraulic linear actuator may however fail on occurrence of a single fault, such as for example a blockade of the ball-screw drive. Operation of the braking system is then no longer possible so that the driver must brake in fall-back level. On vehicles with autonomous driver functions such as e.g. brake-by-wire systems however, the driver does not have or only has restricted access to a fall-back level.

To solve such a problem, DE 11 2005 003 675 T5, which is incorporated by reference, proposes a fault-tolerant linear actuator which is constructed redundantly with regard to components important for function. This known linear actuator thus comprises a first motorized drive device with a first motor and assigned thereto a first rotatable ball nut provided with ball bearings, a second motorized drive device with a second motor and an assigned second rotatable ball nut provided with ball bearings, and a single ball spindle which is in engagement with both the first and the second ball nuts. The ball spindle moves when one of the motors drives the ball nut or when both motors drive the ball nuts. The two drive devices are each arranged at one end of the single ball spindle so that the drive shafts of the two motors are oriented parallel and offset to the ball spindle. The ball nuts are each driven by the associated motor via a gear.

The disadvantage with this known fault-tolerant linear actuator can be regarded as its design which, because of the axially parallel arrangement of the two drive units and the ball spindle, requires substantial installation space and is therefore unsuitable for use in vehicle construction.

DE 20 2010 016 542 U1, which is incorporated by reference, discloses a solution for a compact spindle drive for a machine tool which comprises a first drive with a first motor and a second drive with a second motor, wherein a spindle shaft can be driven optionally by means of the first drive and/or the second drive, and the motor axes of the drives run coaxial to the spindle shaft. The compact structure results because the second drive at least partially surrounds the first drive. This is achieved in that the first drive is configured as a direct drive with a rotor coupled rotationally fixedly to the spindle shaft or as an internal rotor. The second drive is also configured as a direct drive in the form of an external rotor motor with a rotor which can be coupled to the spindle shaft via a clutch.

SUMMARY OF THE INVENTION

An aspect of the present invention specifies a linear actuator for generating a linear actuating force which is improved in comparison with the prior art, which remains fully functioning on occurrence of at least one single fault, and which is suitable for implementation of a hydraulic or pneumatic actuating element e.g. as part of a braking system for a vehicle, i.e. in particular requires little construction space.

Such a linear actuator for generating a linear actuating force comprises:
 a first motorized drive unit having a first drive shaft formed as a hollow shaft,
 a first rotation-translation gear driven by the first motorized drive unit and having a first threaded spindle and a first threaded nut in engagement with the threaded spindle, wherein the drive shaft of the first motorized drive unit is configured as a first threaded spindle,
 a second motorized drive unit arranged axially to the first motorized drive unit and having a drive shaft, and
 a second rotation-translation gear driven by the motorized drive unit and having a second threaded spindle and a threaded nut in engagement with the second threaded spindle,
wherein the drive shaft of the second motorized drive unit is connected rotationally fixedly to the second threaded spindle via the hollow shaft.

In this linear actuator according to an aspect of the invention therefore all components important to function, such as the motorized drive units and the rotation-translation gear, are present redundantly. For the motorized drive units, this includes both the rotors and the motor windings in the case of implementation as electric motors. Thus on failure of one of these components, the complete function of the linear actuator is ensured.

The compact construction results because the main components important to function, i.e. the two motorized drive units and the two rotation-translation gears, are arranged axially behind each other. The material requirements for this linear actuator according to the invention are only insignificantly greater than for a linear actuator with just one drive unit and just one rotation-translation gear.

According to an advantageous embodiment of the invention, to generate the linear actuating force, the first threaded nut is connected to a first force transmission element and the second threaded nut is connected to a second force transmission element. The duplication of the force transmission elements for generating the linear actuating force ensures that the high function reliability is retained, in particular on the occurrence of single faults.

According to a further preferred refinement of the invention, a hydraulic or pneumatic block is provided which cooperates with the first and second force transmission elements. Because of the axial arrangements of the components important for function of the linear actuator according to the invention, such a linear actuator can be integrated in the hydraulic or pneumatic block in a structurally simple fashion. Preferably, for this the first and second force transmission elements are configured as hydraulic or pneumatic pistons which cooperate with cylindrical chambers arranged in the hydraulic or pneumatic block and adapted to the hydraulic or pneumatic pistons.

According to a refinement, the linear actuator according to the invention is integrated in a hydraulic or pneumatic block in that the first and second rotation-translation gears are arranged on opposite sides of the hydraulic or pneumatic block. The cylindrical chambers arranged in this hydraulic or pneumatic block then, together with the force transmission elements configured as pistons, each form a hydraulic or pneumatic piston-cylinder unit.

Furthermore, according to an advantageous embodiment, the first and second drive units together with the first rotation-translation gear are arranged in a first housing which is flanged to the hydraulic or pneumatic block. Preferably, the second rotation-translation gear is arranged in a second housing which is flanged to the hydraulic or pneumatic block. Thus both housings lie on opposite sides of the hydraulic or pneumatic block.

According to a refinement, the two drive units are each configured as an electric motor, e.g. a brushless electric motor with a stator and a rotor. In view of a compact construction, it is advantageous if, in a refinement, the first threaded nut is at least partially surrounded by the rotor of the first drive unit. This namely reduces the axial length of the linear actuator.

Furthermore it is advantageous if, according to a refinement, the first and second rotation-translation gears are each formed as a ball-screw drive.

Finally, in a last advantageous embodiment of the invention, functional reliability is guaranteed also if a control unit is assigned to each of the first and second drive units, wherein the control units are configured identically.

BRIEF DESCRIPTION OF THE DRAWINGS

The invention is described below in detail with reference to an exemplary embodiment depicted in the only FIG. 1. This FIG. 1 shows a diagrammatic cross-section view of a linear actuator according to an aspect of the invention.

DETAILED DESCRIPTION OF THE PREFERRED EMBODIMENTS

FIG. 1 shows diagrammatically a hydraulic block 50 of a hydraulic braking system of a vehicle, which comprises cylindrical chambers 51.1, 51.2, 52.1 and 52.2 which, together with the force transmission elements 23.1, 23.2, 43.1 and 43.2 configured as pistons of the linear actuator 1, form a hydraulic piston-cylinder arrangement. Thus FIG. 1 shows a hydraulic linear actuator 1.

This linear actuator 1 comprises, in a first pot-like housing 2, two motorized drive units 10 and 30 configured as brushless electric motors, namely a first electric motor 10 and a second electric motor 30. These two electric motors 10 and 30 are arranged axially directly adjacent, wherein the second electric motor 30 is arranged on the base side of the pot with regard to the first housing 2, and the first hydraulic motor 10 connects thereto in the direction of the hydraulic block 50.

Each of these two electric motors 10 or 30 is constructed from a stator 13 or 33 with associated motor winding 14 or 34, and a rotor 12 or 32. The two rotors 12 and 32 consist of a pot-like sleeve, and on their outer casing surface carry permanent magnets 12.1 and 32.1 arranged at regular angular intervals. To determine the angular positions of the two rotors 12 and 32 required for phase-correct powering of the two stators 13 and 33, a contactless position sensor is provided in each case (not shown in FIG. 1), the signals from which are supplied to a control unit 4 of the first electric motor 10 and to a control unit 5 of the second electric motor 30. Finally, an operating voltage source (not shown) supplies the motor windings 14 and 34 and the control units 4 and 5 with the necessary operating voltage.

The pot-like rotor 32 of the second electric motor 30 points with its opening in the direction of the base part 2.1 of the first housing 2, which has a central bulge which firstly is partly surrounded by the rotor 32 and secondly receives a bearing 31.1 for receiving the drive shaft 31 of the second electric motor 30. This is arranged rotationally fixedly on the drive shaft 31 via a flange of the rotor 32.

This drive shaft 31 is guided through a drive shaft 11, configured as a hollow shaft, of the first electric motor 10. This drive shaft 11 is connected at the end to the rotor 12 of the first electric motor 10, wherein the opening of the pot-like rotor 12 points in the direction of the hydraulic block 50.

A first rotation-translation gear 20, configured as a ball-screw drive, is assigned to the first electric motor 10 and is driven thereby. For this, the drive shaft 11 is configured simultaneously as the first threaded spindle 21 of this rotation-translation gear 20, and guides an axially movable first threaded nut 22 of this rotation-translation gear 20. The end of this first threaded spindle 21 ends in a cylindrical cavity 53 of the hydraulic block 50 where it is guided by means of a bearing 11.1. A further bearing point 11.2 is provided on the opposite end of the hollow shaft 21 and is connected to the rotor 12.

The first threaded nut 22 is configured as a sleeve so that it is surrounded at least partially by the pot-like rotor 12 of the first electric motor 10 when in this region. Furthermore, this threaded nut 22 on the end face has a peripheral flange 22.1 which carries on the edge first force transmission elements 23.1 and 23.2 running in the axial direction and evenly distributed over the periphery.

These first force transmission elements 23.1 and 23.2 are configured as hydraulic pistons and, together with the chambers 51.1 and 51.2, form a piston-cylinder arrangement of the hydraulic block 50. These hydraulic pistons 23.1 and 23.2 are mounted movably in the chambers 51.1 and 51.2, so that the first threaded nut 22 can only move axially on the first threaded spindle 21. If, on corresponding powering of the first electric motor 10, the first threaded nut 22 moves on the first threaded spindle 21 in the direction toward the hydraulic block 50, a hydraulic pressure is built up in the chambers 51.1 and 51.2 of the hydraulic block 50. The seals of the hydraulic pistons 23.1 and 23.2 are designated 23.11 and 23.21.

A second rotation-translation gear 40, also configured as a ball-screw drive, is assigned to the second electric motor 30 and is driven thereby. For this, the drive shaft 31, guided through the hollow shaft 11 configured as the first threaded spindle 21, is connected to a second threaded spindle 41 of the second rotation-translation gear 40, wherein a second threaded nut 42 is arranged axially movably on this second threaded spindle 41.

This second rotation-translation gear 40 is received by a second pot-like housing 3 flanged to the hydraulic block 50 opposite the first housing 2.

The second threaded spindle 41 is configured as a hollow shaft and is mounted rotatably, firstly with one end via a bearing 41.1 arranged on the end face of the second housing 3, and secondly with the other end inside the cylindrical cavity 53 of the hydraulic block 50 by means of a further bearing 41.2. The second threaded spindle 41 is connected at this end rotationally fixedly to the drive shaft 31 of the second electric motor 30 by means of a connecting bearing 31.2.

The second threaded nut 42 is configured as a sleeve, corresponding to the first threaded nut 22, and also has a radially protruding flange 42.1 which carries on its periphery second force transmission elements 43.1 and 43.2 running in the axial direction and evenly distributed over the periphery, and which as hydraulic pistons also cooperate with chambers 52.1 and 52.2 arranged in the hydraulic block 50 as a piston-cylinder arrangement, so that in this way only an axial movement on the second threaded spindle 41 is possible for the second threaded nut 42. If, on corresponding powering of the second electric motor 30, the second threaded nut 42 moves on the first threaded spindle 41 in the direction toward the hydraulic block 50, a hydraulic pressure is built up in the chambers 52.1 and 52.2 of the hydraulic block 50.

In order to ensure an independent functioning firstly of the first hydraulic pistons 23.1 and 23.2 of the first threaded nut 22, cooperating with the chambers 51.1 and 51.2, and secondly of the second hydraulic pistons 43.1 and 43.2 of the second threaded nut 42, cooperating with the chambers 52.1 and 52.2, the hydraulic pistons 23.1 and 23.2 of the first threaded nut 22 arranged in a circle, opposite the hydraulic pistons 43.1 and 43.2 of the second threaded nut 42, are offset to each other and hence also the associated chambers 51.1 and 51.2 or 52.1 and 52.2 in the hydraulic block 50.

The hydraulic block 50 may also be configured as a pneumatic block.

LIST OF REFERENCE NUMERALS

1 Linear actuator
2 First housing of linear actuator 1
2.1 Base part of first housing 2
3 Second housing of linear actuator 1
4 Control unit of first drive unit 10
5 Control unit of second drive unit 30
10 First motorized drive unit, electric motor
11 Drive shaft of first drive unit 10
12 Rotor of first drive unit 10
12.1 Permanent magnet
13 Stator of first drive unit 10
14 Motor winding of first drive unit 10
20 First rotation-translation gear
21 First threaded spindle of the first rotation-translation gear 20
22 First threaded nut of the first rotation-translation gear 20
22.1 Flange of first threaded nut 22
23.1 First power transmission element, hydraulic piston
23.11 Seal of hydraulic piston 23.1
23.2 First power transmission element, hydraulic piston
23.21 Seal of hydraulic piston 23.2
30 Second motorized drive unit, electric motor
31 Drive shaft of second drive unit 30
31.1 Bearing of drive shaft 31
31.2 Connecting bearing of drive shaft 31
32 Rotor of second drive unit 30
32.1 Permanent magnet
33 Stator of second drive unit 30
34 Motor winding of second drive unit 30
40 Second rotation-translation gear
41 Second threaded spindle of second rotation-translation gear 40
41.1 Bearing of second threaded spindle 41
41.2 Bearing of second threaded spindle 41
42 Second threaded nut of second rotation-translation gear 40
42.1 Flange of second threaded nut 42
43.1 Second power transmission element, hydraulic piston
43.2 Second power transmission element, hydraulic piston
50 Hydraulic or pneumatic block
51.1 Cylindrical chamber of hydraulic or pneumatic block 50
51.2 Cylindrical chamber of hydraulic or pneumatic block 50
52.1 Cylindrical chamber of hydraulic or pneumatic block 50
52.2 Cylindrical chamber of hydraulic or pneumatic block 50
53 Cavity of hydraulic or pneumatic block 50

The invention claimed is:

1. A linear actuator for generating a linear actuating force, comprising:
   a first motorized drive unit having a first drive shaft formed as a hollow shaft,
   a first rotation-translation gear driven by the first motorized drive unit and having a first threaded spindle and a first threaded nut in engagement with the threaded spindle, wherein the drive shaft of the first motorized drive unit is configured as the first threaded spindle,
   a second motorized drive unit arranged axially to the first motorized drive unit and having a drive shaft, and
   a second rotation-translation gear driven by the second motorized drive unit and having a second threaded spindle and a threaded nut in engagement with the second threaded spindle, wherein the drive shaft of the second motorized drive unit is connected rotationally fixedly to the second threaded spindle via the hollow shaft,
   a first force transmission element disposed radially outward from the first threaded spindle and coupled thereto, and
   a second force transmission element disposed radially outward from the second threaded spindle and coupled thereto.

2. The linear actuator as claimed in claim 1, wherein the first threaded nut is connected to the force transmission element, and the second threaded nut is connected to the second force transmission element.

3. The linear actuator as claimed in claim 2, wherein the first and second force transmission elements are configured as hydraulic or pneumatic pistons which cooperate with cylindrical chambers arranged in the hydraulic or pneumatic block and adapted to the hydraulic or pneumatic pistons.

4. The linear actuator as claimed in claim 3, wherein the first and second rotation-translation gears are arranged on opposite sides of the hydraulic or pneumatic block.

5. The linear actuator as claimed in claim 1, wherein the first and second drive units are each configured as an electric motor.

6. The linear actuator as claimed in claim 1, wherein the first and second rotation-translation gears are each formed as a ball-screw drive.

7. The linear actuator as claimed in claim 1, wherein a control unit is assigned to each of the first and second drive units, wherein the control units are configured identically.

8. A linear actuator for generating a linear actuating force, comprising:

a first motorized drive unit having a first drive shaft formed as a hollow shaft, a first rotation-translation gear driven by the first motorized drive unit and having a first threaded spindle and a first threaded nut in engagement with the threaded spindle, wherein the drive shaft of the first motorized drive unit is configured as the first threaded spindle, and the first threaded nut is connected to a first force transmission element, a second motorized drive unit arranged axially to the first motorized drive unit and having a drive shaft, and a second rotation-translation gear driven by the second motorized drive unit and having a second threaded spindle and a threaded nut in engagement with the second threaded spindle, wherein the drive shaft of the second motorized drive unit is connected rotationally fixedly to the second threaded spindle via the hollow shaft, and the second threaded nut is connected to a second force transmission element, wherein the first and second force transmission elements cooperate with a hydraulic or pneumatic block to generate a hydraulic or pneumatic pressure.

9. The linear actuator as claimed in claim 8, wherein the first and second rotation-translation gears are arranged on opposite sides of the hydraulic or pneumatic block.

10. The linear actuator as claimed in claim 8, wherein the first and second drive units together with the first rotation-translation gear are arranged in a first housing which is flanged to the hydraulic or pneumatic block.

11. The linear actuator as claimed in claim 8, wherein the second rotation-translation gear is arranged in a second housing which is flanged to the hydraulic or pneumatic block.

12. A linear actuator for generating a linear actuating force, comprising:

a first motorized drive unit having a first drive shaft formed as a hollow shaft, a first rotation-translation gear driven by the first motorized drive unit and having a first threaded spindle and a first threaded nut in engagement with the threaded spindle, wherein the drive shaft of the first motorized drive unit is configured as the first threaded spindle, a second motorized drive unit arranged axially to the first motorized drive unit and having a drive shaft, and a second rotation-translation gear driven by the second motorized drive unit and having a second threaded spindle and a threaded nut in engagement with the second threaded spindle, wherein the drive shaft of the second motorized drive unit is connected rotationally fixedly to the second threaded spindle via the hollow shaft, wherein the first threaded nut is at least partially surrounded by the rotor of the first drive unit.

13. The linear actuator as claimed in claim 12, wherein the first and second drive units are each configured as an electric motor.

* * * * *